(12) United States Patent
Nishizawa

(10) Patent No.: US 8,921,245 B2
(45) Date of Patent: Dec. 30, 2014

(54) GLASS SUBSTRATE AND METHOD FOR MANUFACTURING SAME

(71) Applicant: Asahi Glass Company, Limited, Chiyoda-ku (JP)

(72) Inventor: Manabu Nishizawa, Chiyoda-ku (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 324 days.

(21) Appl. No.: 13/692,536

(22) Filed: Dec. 3, 2012

(65) Prior Publication Data
US 2013/0267402 A1    Oct. 10, 2013

Related U.S. Application Data

(63) Continuation of application No. PCT/JP2011/062520, filed on May 31, 2011.

(30) Foreign Application Priority Data

Jun. 3, 2010  (JP) ................................ 2010-127709

(51) Int. Cl.
| | |
|---|---|
| *C03C 3/085* | (2006.01) |
| *C03C 3/091* | (2006.01) |
| *C03B 18/02* | (2006.01) |
| *C03B 17/06* | (2006.01) |
| *C03C 3/087* | (2006.01) |
| *C03B 19/09* | (2006.01) |

(52) U.S. Cl.
CPC ............... *C03C 3/085* (2013.01); *C03C 3/087* (2013.01); *C03C 3/091* (2013.01); *C03B 18/02* (2013.01); *C03B 19/09* (2013.01)
USPC ........ 501/69; 501/66; 501/70; 65/90; 65/99.2

(58) Field of Classification Search
CPC ........ C03C 3/085; C03C 3/087; C03C 3/091; C03B 17/06; C03B 17/064; C03B 18/02
USPC ............................. 501/66, 69, 70; 65/90, 99.2
See application file for complete search history.

(56) References Cited

U.S. PATENT DOCUMENTS

| | | | | |
|---|---|---|---|---|
| 6,333,285 | B1 * | 12/2001 | Chopinet et al. ................. | 501/69 |
| 6,518,211 | B1 * | 2/2003 | Bradshaw et al. ............... | 501/69 |
| 7,951,734 | B2 | 5/2011 | Nishizawa et al. | |
| 8,236,717 | B2 | 8/2012 | Nishizawa et al. | |
| 8,324,123 | B2 | 12/2012 | Shimada et al. | |
| 8,349,454 | B2 * | 1/2013 | Murata et al. .................. | 428/410 |
| 2005/0245384 | A1 * | 11/2005 | Ito ................................... | 501/70 |
| 2009/0298669 | A1 * | 12/2009 | Akiba et al. .................... | 501/70 |
| 2011/0003483 | A1 | 1/2011 | Nishizawa et al. | |

FOREIGN PATENT DOCUMENTS

| | | |
|---|---|---|
| CN | 101591139 A | 12/2009 |
| CN | 101679105 A | 3/2010 |
| JP | 11-11974 | 1/1999 |
| JP | 11-135819 | 5/1999 |
| JP | 11-240735 | 9/1999 |
| JP | 2001-261373 | 9/2001 |
| JP | 2005-314169 | 11/2005 |
| JP | 2006-137631 | 6/2006 |
| JP | 2006-169028 | 6/2006 |
| JP | 2010-277771 | 12/2010 |
| WO | WO 2008149858 A1 * | 12/2008 |
| WO | WO 2009/131053 A1 | 10/2009 |

OTHER PUBLICATIONS

Machine Translation of JP 2010-277771, Dec. 9, 2010.*
International Search Report issued Aug. 2, 2011 in PCT/JP2011/062520 filed May 31, 2011.

* cited by examiner

*Primary Examiner* — Karl Group
*Assistant Examiner* — Elizabeth A Bolden
(74) *Attorney, Agent, or Firm* — Oblon, Spivak, McClelland, Maier & Neustadt, L.L.P.

(57) ABSTRACT

The present invention provides a glass substrate having high glass transition temperature and small compaction (C) in a heat treatment at a low temperature (150 to 300° C.), the glass substrate including $SiO_2$, $Al_2O_3$, $B_2O_3$, MgO, CaO, SrO, BaO, $ZrO_2$, $Na_2O$, $K_2O$, and $Li_2O$, wherein each amount of these compounds is specifically limited, $Al_2O_3+K_2O$ is 7 to 27 mass %, $Na_2O+K_2O$ is 11.5 to 22 mass %, MgO+CaO+SrO+BaO is 0.2 to 14 mass %, $MgO+0.357Al_2O_3-0.239K_2O-5.58$ is $-3.0$ to $1.5$, $Na_2O+0.272Al_2O_3+0.876K_2O-16.77$ is $-2.5$ to $2.5$, a glass transition temperature is 500° C. or higher, and an average thermal expansion coefficient at 50 to 350° C. is $100\times10^{-7}$/° C. or less.

17 Claims, 1 Drawing Sheet

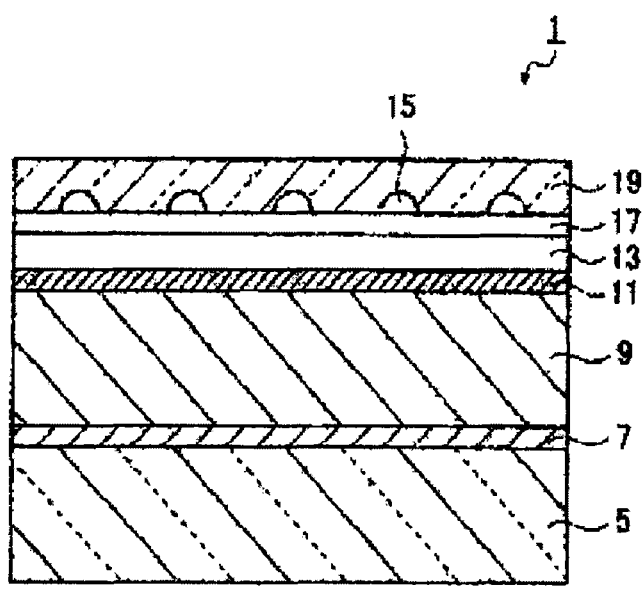

GLASS SUBSTRATE AND METHOD FOR MANUFACTURING SAME

TECHNICAL FIELD

The present invention relates to a glass substrate. Particularly, the present invention relates to a glass substrate for a solar cell having a photovoltaic conversion layer formed between glass substrates, typically a glass substrate for a thin film solar cell, including a glass substrate, a cover glass and a photovoltaic conversion layer which includes Group 11, 13 and 16 elements as main components and is formed on the glass substrate. The present invention further relates to a glass substrate for a display panel, used in various display panels such as liquid crystal display (LCD) panel (particularly, TFT panel) and plasma display panel (PDP).

BACKGROUND ART

Group 11-13 and Group 11-16 compound semiconductors having a chalcopyrite crystal structure or cubic or hexagonal Group 12-16 compound semiconductors have a large absorption coefficient for light in the wavelength range from visible to near infrared, and therefore, they are expected as a material for high-efficiency thin-film solar cells. Representative examples thereof include a $Cu(In,Ga)Se_2$ (hereinafter referred to as CIGS) and a CdTe.

In the CIGS thin-film solar cell, a soda lime glass which is inexpensive and has a thermal expansion coefficient close to that of the CIGS compound semiconductor, has been used as the substrate to obtain the solar cell.

Also, for obtaining high efficiency solar cells, a glass material resistant to a heat treatment with a high temperature has been proposed (see, Patent Document 1).

Furthermore, use of an alkali glass substrate containing an alkali metal oxide has been proposed as a glass substrate for a TFT panel (for "a-Si TFT panel") (see Patent Documents 1 and 2). This is due to that a heat treatment in a TFT panel manufacturing step, that has conventionally been conducted at from 350 to 450° C., is becoming possible to be conducted at a relatively low temperature (from about 250 to 300° C.).

A glass including an alkali metal oxide generally has high thermal expansion coefficient. For this reason, $B_2O_3$ having the effect of reducing a thermal expansion coefficient is generally contained for the purpose of achieving a thermal expansion coefficient preferable as a glass substrate for a TFT panel (Patent Documents 2 and 3).

However, in the case where a glass has a composition containing $B_2O_3$, $B_2O_3$ volatilizes when the glass has been melted, particularly in a melting step, a fining step and a float molding step. As a result, the glass composition tends to become heterogeneous. In the case where the glass composition becomes heterogeneous, such a glass composition affects flatness when molding into a plate shape. A glass substrate for a TFT panel is required to have high degree of flatness in order to maintain a distance between two glasses interposing liquid crystal therebetween, that is, a cell gap, constant for the purpose of ensuring the quality indicated. For this reason, after the glass has been molded into a plate glass by a float process, the surface of the plate glass is polished in order to secure given flatness. In the case where given flatness is not obtained in the plate glass after molding, the time required for a polishing step is prolonged, leading to decrease in productivity. Furthermore, considering environmental load due to the volatilization of $B_2O_3$, the content of $B_2O_3$ in a molten glass is better to be lower content.

However, in the case where the $B_2O_3$ content is low, it has been difficult to decrease a thermal expansion coefficient down to the thermal expansion coefficient preferred as a glass substrate for a TFT panel, and to obtain given Tg and the like while suppressing the increase in viscosity.

PRIOR ART DOCUMENTS

Patent Documents

Patent Document 1: JP-A-11-135819
Patent Document 2: JP-A-2006-137631
Patent Document 3: JP-A-2006-169028

SUMMARY OF THE INVENTION

Problems that the Invention is to Solve

An absorption layer of CIGS solar cell is formed above a glass substrate. As disclosed in Patent Document 1, a heat treatment at higher temperature is preferred to prepare a solar cell having good power generation efficiency, and the glass substrate is required to be durable to the heat treatment at such higher temperature. Patent Document 1 proposes a glass composition having relatively high annealing point. However, it does not always say that the embodiment described in Patent Document 1 has high power generation efficiency.

The present inventors found that power generation efficiency can be increased by increasing an amount of an alkali in a glass substrate to a given range. However, this had the problem that the increase in amount of alkali leads to the decrease in glass transition temperature (Tg).

Thus, there is the problem that it is difficult to achieve both high power generation efficiency and high glass transition temperature in a glass substrate used in CIGS solar cell.

The present invention has an object to provide a glass substrate particularly suitable for CIGS solar cell that achieves both high power generation efficiency and high glass transition temperature.

The present invention has further found that, in the heat treatment at a low temperature as described above, compaction (thermal shrinkage) of a glass at a low temperature greatly affects film formation quality (film formation pattern precision) on a glass substrate. The present invention has an object to provide a glass substrate suitable for a TFT panel, that contains an alkali metal oxide wherein the amount of $B_2O_3$ is small, has small compaction (C) in a heat treatment at a low temperature (from 150 to 300° C.) in a TFT panel manufacturing step, and is difficult to cause position aberration during film formation patterning on a glass substrate.

Means for Solving the Problems

The present invention provides a glass substrate including, in mass percent based on the oxides:
from 68 to 81% of $SiO_2$,
from 0.2 to 18% of $Al_2O_3$,
from 0 to 3% of $B_2O_3$,
from 0.2 to 11% of MgO,
from 0 to 3% of CaO,
from 0 to 3% of SrO,
from 0 to 3% of BaO,
from 0 to 1% of $ZrO_2$,
from 1 to 18% of $Na_2O$,
from 0 to 15% of $K_2O$, and
from 0 to 2% of $Li_2O$,
wherein $Al_2O_3+K_2O$ is from 7 to 27%, Na$_2$O+K$_2$O is from 11.5 to 22%,
MgO+CaO+SrO+BaO is from 0.2 to 14%,
MgO+0.357Al$_2$O$_3$−0.239K$_2$O−−5.58 is from −3.0 to 1.5,
Na$_2$O+0.272Al$_2$O$_3$+0.876K$_2$O−16.77 is from −2.5 to 2.5,
a glass transition temperature is 500° C. or higher, and
an average thermal expansion coefficient at from 50 to 350° C. is 100×10$^{-7}$/° C. or less.

Advantage of the Invention

The glass substrate of the present invention can achieve both high power generation efficiency and high glass transition temperature, and can preferably be used as an inexpensive and high efficient glass substrate for a Cu—In—Ga—Se solar cell.

Furthermore, in the glass substrate of the present invention, the compaction (C) is small (40 ppm or less, preferably 20 ppm or less) in the heat treatment at a low temperature (150 to 300° C.) in a TFT panel manufacturing step, and positional deviation during film formation patterning on a glass substrate is difficult to occur. Therefore, the substrate glass can preferably be used as particularly a glass substrate for a large-sized TFT panel, responding to the recent heat treatment at a low temperature, for example, a glass substrate having one side of 2 m or more as a mother glass.

Furthermore, because the B$_2$O$_3$ content is low, volatilization of B$_2$O$_3$ during the manufacture of the glass is less. Therefore, the glass substrate has excellent homogeneity, and further has excellent flatness and productivity.

BRIEF DESCRIPTION OF THE DRAWING

FIG. 1 is a cross-sectional view schematically showing one embodiment of the solar cell of the present invention.

MODE FOR CARRYING OUT THE INVENTION

Glass Substrate of the Present Invention

The glass substrate of the present invention includes, in mass percent based on the oxides:
from 68 to 81% of SiO$_2$,
from 0.2 to 18% of Al$_2$O$_3$,
from 0 to 3% of B$_2$O$_3$,
from 0.2 to 11% of MgO,
from 0 to 3% of CaO,
from 0 to 3% of SrO,
from 0 to 3% of BaO,
from 0 to 1% of ZrO$_2$,
from 1 to 18% of Na$_2$O,
from 0 to 15% of K$_2$O,
from 0 to 2% of Li$_2$O,
wherein Al$_2$O$_3$+K$_2$O is from 7 to 27%,
Na$_2$O+K$_2$O is from 11.5 to 22%,
MgO+CaO+SrO+BaO is from 0.2 to 14%,
MgO+0.357Al$_2$O$_3$−0.239K$_2$O−5.58 is from −3.0 to 1.5,
Na$_2$O+0.272Al$_2$O$_3$+0.876K$_2$O−16.77 is from −2.5 to 2.5,
a glass transition temperature is 500° C. or higher, and
an average thermal expansion coefficient at from 50 to 350° C. is 100×10$^{-7}$/° C. or less.

The glass transition temperature (Tg) of the glass substrate of the present invention is 500° C. or higher. In the case of using the glass substrate of the present invention as a glass substrate for CIGS solar cell, the glass transition temperature (Tg) of the glass substrate is preferably 525° C. or higher, more preferably 550° C. or higher, and still more preferably 575° C. or higher, in order to secure the formation of a photovoltaic conversion layer at a high temperature.

In the case of using as a glass substrate for a TFT panel, the glass transition temperature (Tg) becomes high by the above range, and the viscosity of a glass is increased in a low temperature heat treatment (150 to 300° C.) in a TFT panel manufacturing step. As a result, mobility of alkali components in the glass to a TFT element is decreased, and deterioration of performance of TFT is suppressed.

An average thermal expansion coefficient at from 50 to 350° C. of the glass substrate of the present invention is 100×10$^{-7}$/° C. or less. In the case of using as a glass substrate for CIGS solar dell, when it exceeds 100×10$^{-7}$/° C., difference in thermal expansion to the CIGS film becomes too large, and defects such as peeling tend to occur. Furthermore, in fabricating a solar cell (specifically in laminating a glass substrate having a photovoltaic conversion layer of CIGS and a cover glass under heating), the glass substrate may easily deform. Furthermore, in the case of using as a glass substrate for a TFT panel, when the glass substrate has the average thermal expansion coefficient in the above range, dimensional change in a manufacturing step of a panel is small, and this facilitates pattern alignment when aligning a counter glass substrate having a color filter and an array glass substrate having TFT. Because influence to quality by thermal stress when using a panel is small, it is particularly preferred from the standpoint of display quality.

The average thermal expansion coefficient is preferably 95×10$^{-7}$/° C. or less, more preferably 90×10$^{-7}$/° C. or less, and still more preferably 85×10$^{-7}$/° C. or less. From the standpoint of thermal expansion difference to the CIGS film, or from the standpoint of thermal expansion difference between the glasses in the case of using an ordinary soda lime glass as the counter glass substrate and using the glass substrate of the present invention as the array glass substrate, the average thermal expansion coefficient is preferably 60×10$^{-7}$/° C. or more, more preferably 70×10$^{-7}$/° C. or more, and still more preferably 75×10$^{-7}$/° C. or more.

The glass substrate of the present invention has the compaction (C) of preferably 40 ppm or less, more preferably 30 ppm or less, and more preferably 20 ppm or less. Furthermore, the compaction (C) is more preferably 15 ppm or less, and still more preferably 10 ppm or less. When the compaction (C) is 40 ppm or less (preferably 20 ppm or less), position aberration is difficult to cause during TFT film formation patterning on an array glass substrate in the heat treatment at a low temperature (150 to 300° C.) in the TFT panel manufacturing step.

The compaction (C) in the present invention means a value measured by the method described below.

After melting an intended glass substrate at 1,600° C., the molten glass is flown out and molded into a plate shape, followed by cooling. The glass substrate obtained is polished to obtain a sample having a size of 100 mm×20 mm×2 mm.

The glass substrate obtained is heated to a temperature of (transition temperature Tg+50°, held at this temperature for 1 minute, and then cooled to room temperature with a temperature lowering rate of 50° C./min. Thereafter, indentation is formed at two places in a long side direction on the surface of the glass substrate at a distance A (A=90 mm).

The glass substrate is heated to 300° C. with a temperature rising rate of 100° C./hour (=1.6° C./min), held at 300° C. for 1 hours and then cooled to room temperature with a temperature lowering rate of 100° C./hour. Distance between the indentations is again measured, and the distance is called B.

The compaction (C) is calculated from A and B thus obtained using the following equation. A and B are measured using an optical microscope.

$$C\,[\text{ppm}] = (A-B)/A \times 10^6$$

In the glass substrate of the present invention, a glass surface devitrification temperature ($T_c$) is preferably 1,200° C. or lower, more preferably 1,100° C. or lower, and still more preferably 1,000° C. or lower.

The glass surface devitrification temperature ($T_c$) is an average value between a maximum temperature at which crystals are deposited on the surface of a glass and a minimum temperature at which crystals are not deposited thereon, by the means that pulverized glass particles are placed on a platinum-made plate, subjected to a heat treatment for 17 hours in an electric furnace controlled to a constant temperature, and observed with an optical microscope after the heat treatment.

In the glass substrate of the present invention, a glass inner devitrification temperature ($T_d$) is preferably 1,200° C. or lower, more preferably 1,100° C. or lower, and still more preferably 1,000° C. or lower.

The glass inner devitrification temperature ($T_d$) is an average value between a maximum temperature at which crystals are deposited inside a glass and a minimum temperature at which crystals are not deposited inside the glass, by the means that pulverized glass particles are placed on a platinum-made plate, subjected to a heat treatment for 17 hours in an electric furnace controlled to a constant temperature, and observed with an optical microscope after the heat treatment.

The viscosity of a glass at $T_d$ is preferably $10^{4.5}$ dPa·s or more, more preferably $10^5$ dPa·s or more, still more preferably $10^{5.5}$ dPa·s or more, and particularly preferably $10^6$ dPa·s or more.

In the glass substrate of the present invention, a temperature ($T_2$) at which the viscosity becomes $10^2$ dPa·s is preferably 1,850° C. or lower, more preferably 1,750° C. or lower, and still more preferably 1,650° C. or lower.

In the glass substrate of the present invention, a temperature ($T_4$) at which the viscosity becomes $10^4$ dPa·s is preferably 1,300° C. or lower, more preferably 1,250° C. or lower, and still more preferably 1,200° C. or lower.

In the glass substrate of the present invention, the density is preferably 2.50 g/cm$^3$ or less, more preferably 2.45 g/cm$^3$ or less, and still more preferably 2.42 g/cm$^3$ or less.

The reason that the glass composition is limited to the above composition in the glass substrate of the present invention is as follows.

SiO$_2$: SiO$_2$ is a component of forming a network of a glass. In the case where the content is less than 68 mass % (hereinafter simply referred to as "%"), heat resistance and chemical durability of the glass are deteriorated, and furthermore, the density, the average thermal expansion coefficient at from 50 to 350° C., and the compaction (C) tend to be increased. The content is preferably 69% or more, more preferably 70% or more, and still more preferably 70.5% or more.

However, in the case where the content exceeds 81%, the viscosity of the glass at high temperature is increased, and the problem may arise that melting property is deteriorated. The content is preferably 80% or less, more preferably 78% or less, still more preferably 77% or less, and particularly preferably 76% or less.

Al$_2$O$_3$: Al$_2$O$_3$ increases a glass transition temperature, improves weather resistance (solarization), heat resistance and chemical durability, and increases Young's modulus. In the case where the content is less than 0.2%, the glass transition temperature may be decreased. Furthermore, the average thermal expansion coefficient at from 50 to 350° C. and the compaction (C) may be increased. The content is preferably 1% or more, more preferably 2% or more, and still more preferably 4% or more.

However, in the case where the content exceeds 18%, the viscosity of the glass at high temperature is increased, and melting property may be deteriorated. Furthermore, the devitrification temperatures (surface devitrification temperature ($T_c$) on a glass surface, and inner devitrification temperature ($T_d$) inside a glass) are increased, and moldability may be deteriorated. Additionally, power generation efficiency may be decreased, that is, an amount of an alkali elution described hereinafter may be decreased. The content is preferably 16% or less, more preferably 14% or less, and still more preferably 12% or less.

B$_2$O$_3$ may be contained in an amount up to 3% in order to improve melting property. In the case where the content exceeds 3%, a glass transition temperature is decreased, or an average thermal expansion coefficient at from 50 to 350° C. is decreased, and this is not preferred in a process for forming a CIGS film in the case of using as a glass substrate for CIGS solar cell. The content is preferably 2% or less, and more preferably 1% or less. Still more preferably, B$_2$O$_3$ is not substantially contained.

The term "is not substantially contained" means that B$_2$O$_3$ is not contained other than the case where B$_2$O$_3$ is contained as an unavoidable impurity from a raw material or the like, that is, B$_2$O$_3$ is not positively contained.

In the case of using as a glass substrate for a TFT panel, when the B$_2$O$_3$ content is low, an amount of B$_2$O$_3$ volatilized is small in a melting step, a fining step and a molding step when melting a glass in the manufacture of a glass substrate, and a glass substrate produced has excellent homogeneity and flatness. As a result, in the case of using as a glass substrate for a TFT panel, requiring high degree of flatness, the quality indicated is excellent as compared with the conventional glass substrate for a TFT panel.

Furthermore, even considering environmental load by volatilization of B$_2$O$_3$, the lower amount of B$_2$O$_3$ is preferred.

MgO: MgO is contained for the reason that MgO has the effects of decreasing a viscosity when melting a glass and accelerating melting. However, in the case where the content is less than 0.2%, the viscosity of a glass at a high temperature is increased, and melting property may be deteriorated. Furthermore, power generation efficiency may be decreased, that is, an amount of an alkali elution described hereinafter may be decreased. The content is preferably 0.5% or more, more preferably 1% or more, and still more preferably 2% or more.

However, in the case where the content exceeds 11%, the average thermal expansion coefficient at from 50 to 350° C. and the compaction (C) may be increased. Furthermore, the devitrification temperature ($T_c$) may be increased. The content is preferably 10% or less, more preferably 9% or less, and still more preferably 8% or less.

CaO: CaO has the effects of decreasing a viscosity when melting a glass and accelerating melting, and therefore can be contained. However, in the case where the content exceeds 3%, the average thermal expansion coefficient at from 50 to 350° C. of a glass and the compaction (C) of a glass may be increased. The content is preferably 2% or less, and more preferably 1% or less. Still more preferably, CaO is not substantially contained.

SrO: SrO has the effects of decreasing a viscosity when melting a glass and accelerating melting, and therefore can be contained. However, in the case where the content exceeds 3%, power generation efficiency is decreased, that is, an amount of an alkali elution described hereinafter is decreased, and the average thermal expansion coefficient at from 50 to 350° C. of a glass substrate and the compaction (C) of a glass substrate may be increased. The content is preferably 2% or less, and more preferably 1% or less. Still more preferably, SrO is not substantially contained.

BaO: BaO has the effects of decreasing a viscosity when melting a glass and accelerating melting, and therefore can be contained. However, in the case where the content exceeds 3%, power generation efficiency is decreased, that is, an amount of an alkali elution described hereinafter is decreased, and an average thermal expansion coefficient at from 50 to 350° C. of a glass substrate and the compaction (C) of a glass substrate may be increased. The content is preferably 2% or less, and more preferably 1% or less. Still more preferably, BaO is not substantially contained.

$ZrO_2$: $ZrO_2$ has the effects of decreasing a viscosity when melting a glass and accelerating melting, and therefore can be contained. However, in the case where the content exceeds 1%, power generation efficiency is decreased, that is, an amount of an alkali elution described hereinafter is decreased, and the average thermal expansion coefficient at from 50 to 350° C. of a glass substrate and the compaction (C) of a glass substrate may be increased. The content is preferably 0.5% or less. More preferably, $ZrO_2$ is not substantially contained.

SrO, BaO and $ZrO_2$ decrease a viscosity when melting a glass, making easy to melt a glass. Therefore, those can be contained up to 3% in total. However, in the case where the total content exceeds 3%, power generation efficiency may be decreased in the case of using as a glass substrate for CIGS solar cell, and the compaction (C) that is important in the case of using as a glass substrate for a TFT panel may be increased. The total content is more preferably 2% or less, and still more preferably 1% or less. Particularly preferably, those are not substantially contained.

MgO, CaO, SrO and BaO decrease a viscosity at a melting temperature of a glass, making easy to melt a glass. Therefore, the total content is 0.2% or more. However, in the case where the total content exceeds 14%, the average thermal expansion coefficient at from 50 to 350° C. of a glass and the compaction (C) of a glass may be increased.

Furthermore, from the standpoints of the density and the average thermal expansion coefficient at from 50 to 350° C., the total content is preferably 0.5% or more, more preferably 1% or more, and still more preferably 2% or more. The total content is preferably 12% or less, more preferably 10% or less, and still more preferably 8% or less.

Considering the reduction of compaction (C), the total content of $Al_2O_3$ and MgO is preferably 8% or more, more preferably 10% or more, and still more preferably 11% or more.

$Na_2O$: $Na_2O$ has the effect of decreasing a viscosity at a glass melting temperature, making it easy to melt a glass, and therefore is contained in an amount of from 1 to 18%. In the case of using as a glass substrate for CIGS solar cell, $Na_2O$ is a component for contributing to the improvement of conversion efficiency of a solar cell of CIGS, and is an essential component. Na diffuses in an absorption layer of a solar cell of CIGS constituted on a glass, and increases conversion efficiency. However, in the case where the content is less than 1%, Na diffusion in an absorption layer of a solar cell of CIGS on a glass becomes insufficient, and the conversion efficiency may become insufficient. The content is preferably 2% or more, more preferably 3% or more, and still more preferably 4% or more.

In the case where the $Na_2O$ content exceeds 18%, the average thermal expansion coefficient at from 50 to 350° C. and the compaction (C) are increased or chemical durability is deteriorated. The content is preferably 17% or less, more preferably 16% or less, and still more preferably 15% or less.

$K_2O$: $K_2O$ has the same effect as $Na_2O$, and is therefore contained in an amount of from 0 to 15%. However, in the case where the content exceeds 15%, the average thermal expansion coefficient at from 50 to 350° C. and the compaction (C) may be increased. In the case of using as a glass substrate for CIGS solar cell, when the content of $K_2O$ exceeds 15%, power generation efficiency is decreased, that is, an amount of an alkali elution described hereinafter may be decreased. Therefore, when $K_2O$ is contained, the content is preferably 1% or more. The content is preferably 14% or less, more preferably 13% or less, and still more preferably 12.5% or less.

$Li_2O$: $Li_2O$ decreases a viscosity at a glass melting temperature, making it easy to melt a glass, and therefore is contained in an amount of from 0 to 2%. However, in the case where the content exceeds 2%, a glass transition point may be decreased. The content is preferably 2% or less in order to achieve that the average thermal expansion coefficient at from 50 to 350° C. is $100 \times 10^{-7}$/° C. or less.

The content of $Li_2O$ is preferably 1% or less, and more preferably 0.5% or less. Still more preferably, $Li_2O$ is not substantially contained.

$Al_2O_3$ and $K_2O$: $Al_2O_3$ and $K_2O$ decrease an average thermal expansion coefficient at from 50 to 350° C., or increase Tg. Therefore, the total content of $Al_2O_3$ and $K_2O$ is from 7 to 27%. In the case where the content is less than 7%, Tg is decreased, and $T_c$ and $T_d$ may be increased too much. The content is preferably 8% or more, more preferably 9% or more, and still more preferably 10% or more.

However, in the case where the total content exceeds 27%, $T_2$, $T_4$ and a density may be increased too much. The total content is preferably 24% or less, more preferably 20% or less, and still more preferably 18% or less.

$Na_2O$ and $K_2O$: $Na_2O$ and $K_2O$ sufficiently decrease a viscosity at a glass melting temperature or improve conversion efficiency of CIGS solar cell in the case of using as a glass substrate for CIGS solar cell. Therefore, the total content of $Na_2O$ and $K_2O$ is from 11.5 to 22%. The total content is preferably 12% or more, more preferably 13% or more, and still more preferably 14% or more.

However, in the case where the total content exceeds 22%, Tg may be decreased too much, and an average thermal expansion coefficient at from 50 to 350° C. may be increased too much. The total content is preferably 20% or less, more preferably 19% or less, and still more preferably 18% or less.

MgO, $Al_2O_3$ and $K_2O$: MgO, $Al_2O_3$ and $K_2O$ are contained so that the following formula 1 satisfies from −3.0 to 1.5.

$$MgO + 0.357Al_2O_3 - 0.239K_2O - 5.58 \quad \text{(Formula 1)}$$

The above formula is an index for satisfying $T_4 - T_c \geq 0°$ C. or $T_4 - T_d \geq 150°$ C. described hereinafter. The present inventors have found from the results of experiments and trial and error that in the case where the above each component satisfies the scope of the present application and the value obtained by the above formula is from −3.0 to 1.5, $T_4 - T_c \geq 0°$ C. or $T_4 - T_d \geq 150°$ C. is satisfied while satisfying Tg of 500° C. or higher and an average thermal expansion coefficient at from 50 to 350° C. of $100 \times 10^{-7}$ or less. The value is preferably −2.0 or more, more preferably −1.5 or more, and still more preferably −1.0 or more. Furthermore, the value is preferably 1.0 or less.

$Na_2O$, $Al_2O_3$ and $K_2O$: $Na_2O$, $Al_2O_3$ and $K_2O$ are contained so that the following formula 2 satisfies from −2.5 to 2.5.

$$Na_2O + 0.272Al_2O_3 + 0.876K_2O - 16.77 \quad \text{(Formula 2)}$$

The above formula is an index for satisfying $T_4-T_e \geq 0°$ C. or $T_4-T_d \geq 150°$ C. described hereinafter. The present inventors have found from the results of experiments and trial and error that in the case where the above each component satisfies the scope of the present application and the value obtained by the above formula is from −2.5 to 2.5, $T_4-T_e \geq 0°$ C. or $T_4-T_d \geq 150°$ C. is satisfied while satisfying Tg of 500° C. or higher and an average thermal expansion coefficient at from 50 to 350° C. of $100 \times 10^{-7}$ or less. The value is preferably −2.0 or more, more preferably −1.5 or more, and still more preferably −1.0 or more. Furthermore, the value is preferably 2.0 or less, more preferably 1.5 or less, and still more preferably 1.0 or less.

The glass substrate of the present invention preferably essentially consists of the above matrix composition, but may contain other components in ranges that do not impair the object of the present invention. In the case of using as a glass substrate for CIGS solar cell, the glass may typically contain other components in a total amount of 5% or less. For example, there is a case where the glass may contain ZnO, $Li_2O$, $WO_3$, $Nb_2O_5$, $V_2O_5$, $Bi_2O_3$, $MoO_3$, $P_2O_5$ and the like for the purpose of improving weather resistance, melting property, devitrification resistance, ultraviolet shielding and the like.

To improve melting property and fining property of a glass, those raw materials may be added to the matrix composition raw material such that $SO_3$, F, Cl and $SnO_2$ are contained in the glass in a total amount of 2% or less. In the case of using as a glass substrate for a TFT panel, addition of those is more preferred.

To improve chemical durability of a glass, $ZrO_2$, $Y_2O_3$, $La_2O_3$, $TiO_2$ and $SnO_2$ may be contained in the glass in a total amount of 5% or less. Of those, $Y_2O_3$, $La_2O_3$ and $TiO_2$ contribute to the improvement of Young's modulus of a glass.

To adjust color tone of the glass, the glass may contain colorants such as $Fe_2O_3$ and $CeO_2$. The total content of the colorants is preferably 1% or less.

Considering environmental load, it is preferred that the glass substrate of the present invention does not substantially contain $As_2O_3$ and $Sb_2O_3$. Considering that float molding is stably conducted, it is preferred that the glass substrate does not substantially contain ZnO. However, the glass substrate of the present invention may be produced by not only the molding with a float process, but the molding with a fusion process.

<Method for Manufacturing Glass Substrate of the Present Invention, and Uses>

The glass substrate of the present invention is preferably used as a glass substrate for CIGS solar cell and a glass substrate for a TFT panel. Detailed description is given below.

(1) Method for Manufacturing Glass Substrate

In the case of manufacturing a glass substrate of the present invention, melting and fining steps and a molding step are carried out in the same manners as in the manufacture of the conventional glass substrates for a solar cell or a TFT panel. The glass substrate in the present invention is an alkali glass substrate containing alkali metal oxides ($Na_2O$ and $K_2O$). Therefore, $SO_3$ can effectively be used as a fining agent, and a float process and a fusion process (downdraw process) are suitable for the molding method.

In the manufacturing step of a glass substrate for a solar cell or a TFT panel, with the increase of a size of a solar cell and a TFT panel, it is particularly preferred to use a float process that can easily stably mold a large-area glass substrate.

A float process and a fusion process (downdraw process) can be applied as the molding method of the glass substrate of the present invention. However, considering devitrification prevention when molding a plate glass, in the case of a fusion process, as the properties of a glass substrate, $T_4-T_d \geq 150°$ C., more preferably $T_4-T_d \geq 200°$ C., is preferably satisfied. In the case of a float process, $T_4-T_e \geq 0°$ C., more preferably $T_4-T_e \geq 50°$ C., is preferably satisfied.

Preferred embodiment of the method for manufacturing the glass substrate of the present invention is described below.

First, a molten glass obtained by melting raw materials is molded into a plate shape. For example, raw materials are prepared so as to become a composition of a glass substrate to be obtained, and the raw materials are continuously introduced into a melting furnace and heated to about from 1,450 to 1,650° C. to obtain a molten glass. The molten glass is molded into a ribbon-shaped glass substrate by applying, for example, a float process.

Next, the ribbon-shaped glass substrate is taken out of the molding furnace, and cooled to room temperature state by cooling means, followed by cutting. Thus, a glass substrate is obtained.

The cooling means used is cooling means in which when a surface temperature of a ribbon-shaped glass substrate taken out of the molding furnace is $T_H$ (° C.), room temperature is $T_L$ (° C.), and time until the surface temperature of the ribbon-shaped glass substrate is cooled to $T_L$ from $T_H$ is t (min), an average cooling rate represented by $(T_H-T_L)/t$ is from 10 to 300° C./min. The specific cooling means is not particularly limited, and the conventional cooling means may be used. For example, a method of using a heating furnace having temperature gradient may be used.

$T_H$ is preferably the glass transition temperature Tg+20° C., specifically from 540 to 730° C.

The average cooling rate is preferably from 15 to 150° C./min, more preferably from 20 to 80° C./min, and still more preferably from 40 to 60° C. A glass substrate having the compaction (C) of 40 ppm or less, and preferably 20 ppm or less, is easily obtained by the above method for manufacturing the glass substrate.

(2) Glass Substrate for CIGS Solar Cell

The glass substrate of the present invention can preferably be used in a glass substrate for CIGS solar cell.

In the glass substrate for CIGS solar cell of the present invention, an amount of an alkali elution (intensity ratio of Na/In descried hereinafter) is preferably 0.15 or more, and more preferably 0.2 or more.

The glass substrate for CIGS solar cell in the present invention is preferred as a glass substrate for CIGS solar cell and a cover glass.

In the case of applying to a glass substrate for CIGS solar cell, a thickness of the glass substrate is preferably 3 mm or less, and more preferably 2 mm or less. A method for giving a photovoltaic conversion layer of CIGS to a glass substrate is not particularly limited. Heating temperature in forming the photovoltaic conversion layer can be from 500 to 650° C.

In the case of using the glass substrate for CIGS solar cell of the present invention as a cover glass, a thickness of the cover glass is preferably 3 mm or less, and more preferably 2 mm or less. A method for fabricating a cover glass on a glass substrate having a photovoltaic conversion layer is not particularly limited. In the case of the fabrication by heating, the heating temperature can be from 500 to 650° C.

When the glass substrate of the present invention is used in both of a glass substrate for CIGS solar cell and a cover glass, an average thermal expansion coefficient at from 50 to 350° C. is the same between these. Therefore, thermal deformation and the like when fabricating a solar cell do not occur, and this is preferred.

(3) CIGS Solar Cell

The solar cell according to the present invention is described below.

The solar cell according to the present invention includes a glass substrate having a photovoltaic conversion layer of Cu—In—Ga—Se, and a cover glass provided on the glass substrate, wherein one or both of the glass substrate and the cover glass is the glass substrate of the present invention.

The solar cell according to the present invention is described in detail below by reference to the accompanying drawing. The present invention is not limited to the accompanying drawing.

FIG. 1 is a cross-sectional view schematically showing one embodiment of the solar cell according to the present invention.

In FIG. 1, the solar cell (CIGS solar cell) 1 according to the present invention includes a glass substrate 5, a cover glass 19, and a CIGS layer 9 between the glass substrate 5 and the cover glass 19. The glass substrate 5 is preferably composed of the glass substrate of the present invention described above.

The solar cell 1 has a back electrode layer of an Mo film that is a positive electrode 7, on the glass substrate 5, and a light absorption layer (photovoltaic conversion layer) that is a CIGS layer 9 thereon. $Cu(In_{1-x}Ga_x)Se_2$ can be exemplified as a composition of the CIGS layer. x indicates a composition ratio of In and Ga and is 0<x<1. The CIGS layer 9 has thereabove a transparent conductive film 13 of ZnO or ITO through a CdS (cadmium sulfide) or ZnS (zinc sulfide) layer that is a buffer layer 11, and an extraction electrode such as an Al electrode (aluminum electrode) that is a negative electrode 15, above the transparent conductive film 13. A reflection preventive film may be provided at necessary places among those layers. In FIG. 1, a reflection preventive film 17 is provided between the transparent conductive film 13 and the negative electrode 15.

The cover glass 19 may be provided on the negative electrode 15, and if necessary, the negative electrode and the cover glass are sealed with a resin or adhered with a transparent resin for adhesion. The cover glass may use the glass substrate for CIGS solar cell according to the present invention.

In the present invention, the edge of the photovoltaic conversion layer or the edge of the solar cell may be sealed. As the material for sealing, examples thereof includes the same materials as the glass substrate for CIGS solar cell, other glasses, and resins.

Thickness of each layer of the solar cell shown in the accompanying drawing is not limited to the thickness shown in the drawing.

(4) TFT Panel

The glass substrate of the present invention can preferably be used as a glass substrate for a TFT panel.

A method for manufacturing a TFT panel, including a film formation step of forming a gate insulating layer in an array substrate on the surface of the glass substrate of the present invention is described below.

A method for manufacturing a TFT panel using the glass substrate of the present invention is not particularly limited so long as the method includes a film formation step in which after a temperature of a film formation region of the surface of the glass substrate of the present invention is rised to a temperature in a range of from 150 to 300° C. (hereinafter referred to as a "film formation temperature"), it is held at the film formation temperature for from 5 to 60 minutes, and the gate insulating film in an array substrate is formed in the film formation region. The film formation temperature is preferably from 150 to 250° C., more preferably 150 to 230° C., and still more preferably from 150 to 200° C. The time of holding at the film formation temperature is preferably from 5 to 30 minutes, more preferably from 5 to 20 minutes, and still more preferably from 5 to 15 minutes.

The film formation of the gate insulating layer is conducted in the above ranges of the film formation temperature and the holding time, and the glass substrate undergoes heat shrinkage during the period. After the glass substrate has once undergone heat shrinkage, the result of the heat shrinkage is not greatly affected, depending on the subsequent cooling conditions (cooling rate or the like). The glass substrate for a TFT panel in the present invention has small compaction (C). Therefore, the heat shrinkage of the glass substrate is small, and deviation of a film-formation pattern is difficult to occur.

The film formation in the film formation step can be achieved by, for example, the conventional CVD method.

In the method for manufacturing a TFT panel according to the present invention, an array substrate can be obtained by the conventional method. The TFT panel can be manufactured by the following conventional steps using the array substrate.

The TFT panel can be manufactured by a series of steps including a step of an orientation treatment step of forming an oriented film on each of the array substrate and a color filter substrate, and conducting rubbing, a lamination step of laminating the TFT array substrate and the color filter substrate with high precision while maintaining a given gap, a cutting step of cutting a cell from a substrate into a given size, an injection step of injecting a liquid crystal in the cut cell, and a polarizing plate-attaching step of attaching a polarizing plate to the cell.

In the case of using the glass substrate of the present invention as a glass substrate for a TFT panel, when the TFT panel is manufactured by the heat treatment at a low temperature, alkali elution is suppressed, and the heat treatment does not greatly affect the TFT panel.

The glass substrate of the present invention can be used after chemically strengthening by the conventional method. Considering flatness of a glass substrate, it is preferred that the glass substrate is not chemically strengthened in order to improve the quality indicated of a TFT panel and to improve cell efficiency of a solar cell panel.

EXAMPLES

The present invention is described in further detail below by reference to Examples and Manufacturing Examples, but the present invention is not limited to those Examples and Manufacturing Examples.

Examples (Embodiments 1 to 13) of the glass substrate of the present invention and Comparative Examples (Embodiments 14 to 16) are shown below. The value in the parentheses in the Tables indicates a calculated value.

Raw materials of each component for a glass substrate were prepared so as to achieve a composition shown in Tables 1 to 3. A sulfate was added to the raw materials in an amount of 0.1 parts by mass in terms of $SO_3$ per 100 parts by mass of the raw materials of the component for the glass substrate, and the resulting mixture was molten at a temperature of 1,600° C. for 3 hours using a platinum crucible. In melting, a platinum stirrer was inserted, and the mixture was stirred for 1 hour to conduct homogenization of a glass. A molten glass was flown out, and molded into a plate shape, followed by cooling.

An average thermal expansion coefficient (unit: ×10$^{-7}$/° C.) at from 50 to 350° C., a glass transition temperature (Tg) (unit: ° C.), a density, a viscosity, compaction (C), an amount alkali elution described below, and a devitrification temperature (glass surface devitrification temperature ($T_c$), and glass inner devitrification temperature ($T_d$)), of the glass thus obtained, were measured. Furthermore, $T_4-T_c$ and $T_4-T_d$ were calculated. Those are shown in Tables 1 and 3. Measurement method of each property is shown below.

(1) Tg: Tg is a value measured using TMA, and was obtained according to JIS R3103-3 (2001).

(2) Density: About 20 g of a glass bulk free of bubbles was measured by Archimedes method.

(3) Viscosity: Viscosity was measured using a rotary viscometer, and the temperature $T_2$ (° C.) at which the viscosity becomes 10$^2$ dPa·s and the temperature $T_4$ (° C.) at which the viscosity becomes 10$^4$ dPa·s were measured.

Coefficient of Fulcher equation was obtained from the measurement result of a glass viscosity at a high temperature (1,000 to 1,600° C.) of a molten glass, and the glass viscosity at the glass inner devitrification temperature ($T_d$) was determined by the Fulcher equation using the coefficient.

(4) Compaction (C): It was measured by the measurement method of the compaction (C) described before.

(5) Amount of alkali elution: ITO having a thickness of 100 nm is formed on a glass substrate (square type of 40 mm long and 40 mm wide, thickness: 2 mm) by a sputtering method. Subsequently, the sample is held in an electric furnace at 550° C. for 30 minutes under the air atmosphere to conduct a heat treatment. The sample is subjected to a secondary ion mass spectrometry to measure integral strength of all In and all Na in the ITO film. An effusion amount of an alkali is evaluated in terms of intensity ratio of Na/In.

(6) Average thermal expansion coefficient at from 50 to 350° C.: It was measured using a thermomechanical analysis (TMA), and obtained by JIS R3102 (1995).

(7) Devitrification temperature (glass surface devitrification temperature ($T_c$) and glass inner devitrification temperature ($T_d$)): Pulverized glass particles are placed in a platinum plate, and are subjected to a heat treatment in an electric furnace controlled to a constant temperature for 17 hours. By the observation with an optical microscope after the heat treatment, an average value of a maximum temperature at which crystals precipitate on the surface of a glass and a minimum temperature at which crystals do not precipitate thereon is considered as a glass surface devitrification temperature $T_c$ (° C.), and an average value of a maximum temperature at which crystals precipitate inside a glass and a minimum temperature at which crystals do not precipitate inside the glass is considered as a glass inner devitrification temperature $T_d$ (° C.).

SO$_3$ residual amount in the glass was from 100 to 500 ppm.

TABLE 1

| wt % | Embodiment 1 | Embodiment 2 | Embodiment 3 | Embodiment 4 |
| --- | --- | --- | --- | --- |
| SiO$_2$ | 73.0 | 75.3 | 73.2 | 70.5 |
| Al$_2$O$_3$ | 10.0 | 1.7 | 9.8 | 4.9 |
| B$_2$O$_3$ | 0 | 0 | 0 | 0 |
| MgO | 3.0 | 5.9 | 2.1 | 7.7 |
| CaO | 0 | 0 | 0 | 0 |
| SrO | 0 | 0 | 0 | 0 |
| BaO | 0 | 0 | 0 | 0 |
| ZrO$_2$ | 0 | 0 | 0 | 0 |
| Na$_2$O | 14.0 | 10.9 | 9.0 | 4.7 |
| K$_2$O | 0 | 6.2 | 5.9 | 12.2 |
| MgO + CaO + SrO + BaO | 3.0 | 5.9 | 2.1 | 7.7 |
| Al$_2$O$_3$ + K$_2$O | 10.0 | 7.9 | 15.7 | 17.1 |
| Na$_2$O + K$_2$O | 14.0 | 17.1 | 14.9 | 16.9 |
| MgO + 0.357Al$_2$O$_3$ − 0.239K$_2$O − 5.58 | 1.0 | −0.6 | −1.4 | 1.0 |
| Na$_2$O + 0.272Al$_2$O$_3$ + 0.876K$_2$O − 16.77 | −0.1 | 0 | 0.1 | −0.1 |
| Surface devitrification temperature $T_c$ (° C.) | <936 | <862 | <999 | <926 |
| Inner devitrification temperature $T_d$ (° C.) | <936 | <862 | <999 | <926 |
| $T_2$ (° C.) | 1788 | 1590 | 1832 | 1708 |
| $T_4$ (° C.) | 1242 | 1117 | 1278 | 1245 |
| $T_4 - T_c$ (° C.) | >306 | >255 | >279 | >319 |
| $T_4 - T_d$ (° C.) | >306 | >255 | >279 | >319 |
| Glass viscosity at $T_d$ (dPa · s) | ≥10$^{6.1}$ | ≥10$^{5.9}$ | ≥10$^{5.8}$ | ≥10$^{6.5}$ |
| Compaction (C) (ppm) | ≤20 | ≤20 | ≤20 | ≤20 |
|  | 18 | 17 | 12 | 14 |
| Average thermal expansion coefficient at 50 to 350° C. (×10$^7$/° C.) | 77 | 93 | 81 | 87 |
| Tg (° C.) | 584 | 518 | 563 | 609 |
| Density | (2.39) | (2.40) | (2.35) | (2.41) |
|  | 2.40 | 2.41 | 2.39 | 2.42 |
| Amount of alkali elution | (0.35) | (0.46) | (0.21) | (0.2) |

TABLE 2

| wt % | Embodiment 5 | Embodiment 6 | Embodiment 7 | Embodiment 8 | Embodiment 9 | Embodiment 10 | Embodiment 11 | Embodiment 12 | Embodiment 13 |
|---|---|---|---|---|---|---|---|---|---|
| $SiO_2$ | 73.1 | 68.0 | 68.0 | 70.7 | 80.6 | 68.3 | 71.1 | 69.5 | 77.7 |
| $Al_2O_3$ | 0.8 | 12.1 | 18.0 | 7.0 | 0.2 | 3.5 | 0.2 | 15.1 | 0.5 |
| $B_2O_3$ | 0 | 0 | 0 | 0 | 0 | 1.0 | 0 | 2.0 | 0 |
| MgO | 6.8 | 4.7 | 0.2 | 3.9 | 4.1 | 8.4 | 10.6 | 0.2 | 5.3 |
| CaO | 0 | 0 | 0 | 0 | 0 | 0 | 2.0 | 0 | 1.0 |
| SrO | 2.0 | 0 | 0 | 0 | 0 | 1.0 | 0 | 0 | 0 |
| BaO | 0 | 0 | 0 | 1.0 | 0 | 0 | 0 | 0.5 | 0 |
| $ZrO_2$ | 0 | 0 | 0 | 0 | 0 | 0 | 0 | 0 | 0.5 |
| $Na_2O$ | 11.1 | 1.0 | 13.8 | 17.4 | 8.3 | 4.6 | 1.1 | 12.7 | 8.0 |
| $K_2O$ | 6.2 | 14.2 | 0 | 0 | 6.8 | 13.2 | 15.0 | 0 | 7.0 |
| MgO + CaO + SrO + BaO | 8.8 | 4.7 | 0.2 | 4.9 | 4.1 | 9.4 | 12.6 | 0.7 | 6.3 |
| $Al_2O_3 + K_2O$ | 7.0 | 26.3 | 18.0 | 7.0 | 7.0 | 16.7 | 15.2 | 15.1 | 7.5 |
| $Na_2O + K_2O$ | 17.3 | 15.2 | 13.8 | 17.4 | 15.1 | 17.8 | 16.1 | 12.7 | 15.0 |
| $MgO + 0.357Al_2O_3 - 0.239K_2O - 5.58$ | 0 | 0 | 1.0 | 0.8 | -3.0 | 0.9 | 1.5 | 0 | -1.8 |
| $Na_2O + 0.272Al_2O_3 + 0.876K_2O - 16.77$ | 0 | 0 | 1.9 | 2.5 | -2.5 | 0.3 | -2.5 | 0 | -2.5 |
| Surface devitrification temperature $T_c$ (° C.) | <791 | <997 | 1054 | <791 | >1111 | <897 | 918 | <888 | 1044 |
| Inner devitrification temperature $T_d$ (° C.) | <791 | <997 | 1054 | <791 | >1111 | <897 | 918 | <888 | 1044 |
| $T_2$ (° C.) | 1536 | 1886 | 1950 | 1573 | 1668 | 1627 | 1617 | 1900 | 1641 |
| $T_4$ (° C.) | 1079 | 1354 | 1395 | 1090 | 1155 | 1192 | 1206 | 1306 | 1157 |
| $T_4 - T_c$ (° C.) | >288 | >357 | 341 | >299 | <44 | >295 | 288 | >418 | 113 |
| $T_4 - T_d$ (° C.) | >288 | >357 | 341 | >299 | <44 | >295 | 288 | >418 | 113 |
| Glass viscosity at $T_d$ (dPa·s) | $\geq 10^{6.5}$ | $\geq 10^{6.6}$ | $10^{6.3}$ | $\geq 10^{6.5}$ | $<10^{4.3}$ | $\geq 10^{6.8}$ | $10^{6.9}$ | $\geq 10^{6.5}$ | $10^{4.8}$ |
| Compaction (C) (ppm) | 34 | 8 | 0 | 22 | 22 | 20 | 16 | 5 | 14 |
| Average thermal expansion coefficient at 50 to 350° C. ($\times 10^7$/° C.) | 96 | 81 | 78 | 97 | 87 | 74 | 82 | 75 | 83 |
| Tg (° C.) | 502 | 648 | 646 | 530 | 511 | 614 | 624 | 624 | 529 |
| Density | 2.46 | 2.39 | 2.40 | 2.45 | 2.37 | 2.44 | 2.45 | 2.40 | 2.40 |

TABLE 3

| wt % | Embodiment 14 | Embodiment 15 | Embodiment 16 |
|---|---|---|---|
| $SiO_2$ | 73.0 | 73.8 | 67.2 |
| $Al_2O_3$ | 4.0 | 0.2 | 4.8 |
| $B_2O_3$ | 0 | 0 | 0 |
| MgO | 11.0 | 6.9 | 6.9 |
| CaO | 0 | 0 | 0 |
| SrO | 0 | 0 | 0 |
| BaO | 0 | 0 | 0 |
| $ZrO_2$ | 0 | 0 | 0 |
| $Na_2O$ | 12.0 | 14.4 | 6.9 |
| $K_2O$ | 0 | 4.7 | 14.2 |
| MgO + CaO + SrO + BaO | 11.0 | 6.9 | 6.9 |
| $Al_2O_3 + K_2O$ | 4.0 | 4.9 | 19.0 |
| $Na_2O + K_2O$ | 12.0 | 19.1 | 21.1 |
| $MgO + 0.357Al_2O_3 - 0.239K_2O - 5.58$ | 6.8 | 0.3 | -0.4 |
| $Na_2O + 0.272Al_2O_3 + 0.876K_2O - 16.77$ | -3.7 | 1.8 | 3.9 |
| Surface devitrification temperature $T_c$ (° C.) | | | |
| Inner devitrification temperature $T_d$ (° C.) | 1215 | | |
| $T_2$ (° C.) | | | |
| $T_4$ (° C.) | (1170) | | |
| $T_4 - T_c$ (° C.) | | | |
| $T_4 - T_d$ (° C.) | (-45) | | |
| Glass viscosity at $T_d$ (dPa·s) | | | |
| Compaction (C) (ppm) | | | |
| Average thermal expansion coefficient at 50 to 350° C. ($\times 10^7$/° C.) | 74 | (102) | (106) |
| Tg (° C.) | (578) | (477) | (578) |
| Density | (2.43) | (2.43) | (2.42) |

As is apparent from Table 1, the glasses of the Examples (Embodiments 1 to 4) have large amount of alkali elution and high glass transition temperature Tg, and therefore can achieve both of high power generation efficiency and high glass transition temperature. Furthermore, the glasses of the Examples have an average thermal expansion coefficient at from 50 to 350° C. of $100 \times 10^{-7}$/° C. or less. Therefore, in the case of using as a glass substrate for CIGS solar cell, thermal expansion difference to the CIGS film becomes too large, and defects such as peeling are difficult to occur.

Furthermore, in fabricating a solar cell (specifically in adhering a glass substrate having a photovoltaic conversion layer of CIGS and a cover glass under heating), the glass substrate is difficult to deform, and this is preferred. In the case of using as a glass substrate for a TFT panel, dimensional change in the manufacturing step of a panel is small, and pattern alignment when aligning a color filter and an array plate becomes easy. Furthermore, influence to quality due to thermal stress when using a panel is small, and this is particularly preferred in the quality indicated.

Because the compaction (C) is 40 ppm or less, positional deviation during film formation patterning on a glass substrate is difficult to occur. Therefore, the glass substrate can preferably be used as particularly a glass substrate for a large-sized TFT panel, responding to the recent heat treatment at a low temperature, for example, a glass substrate having one side of 2 m or more as a mother glass.

Embodiments 1 to 4 satisfy $T_4-T_c \geq 0°$ C. or $T_4-T_d \leq 150°$ C. while satisfying Tg of 500° C. or higher and an average thermal expansion coefficient at from 50 to 350° C. of $100 \times 10^{-7}$ or less, and thus, devitrification in the plate glass formation is suppressed.

The glasses of the Examples (Embodiments 5 to 13) having the compositions shown in Table 2 have large amount of alkali elution, and glasses having a glass transition temperature Tg of 500° C. or higher, an average thermal expansion coefficient at from 50 to 350° C. of $100 \times 10^{-7}/°$ C. or less and the compaction (C) of 40 ppm are obtained.

In Embodiment 14, the $T_4-T_d$ is −45, and thus, devitrification tends to occur during the formation of a plate glass.

In Embodiment 15, because $Al_2O_3+K_2O$ is small as 4.9%, Tg is low as about 477° C. Furthermore, the average thermal expansion coefficient at from 50 to 350° C. is large as $102 \times 10^{-7}/°$ C. In Embodiment 16, $SiO_2$ is small, and the average thermal expansion coefficient at from 50 to 350° C. is large as $106 \times 10^{-7}/°$ C.

While the invention has been described in detail and with reference to specific embodiments thereof, it will be apparent to one skilled in the art that various changes and modifications can be made therein without departing from the spirit and scope of the invention.

This application is based on Japanese Patent Application No. 2010-127709 filed on Jun. 3, 2010, the contents of which are incorporated herein by reference.

INDUSTRIAL APPLICABILITY

The glass substrate of the present invention is preferred as a glass substrate for CIGS solar cell and a cover glass, and can further be used as other substrates for a solar cells and cover glasses.

Furthermore, the glass substrate of the present invention is preferred as a glass substrate for a TFT panel, and can further be used in other substrates for displays, such as plasma display panel (PDP) and inorganic electroluminescence display.

DESCRIPTION OF REFERENCE NUMERALS AND SIGNS

1 Solar cell
5 Glass substrate
7 Positive electrode
9 CIGS layer
11 Buffer layer
13 Transparent conductive film
15 Negative electrode
17 Reflection preventive film
19 Cover glass

The invention claimed is:
1. A glass substrate comprising, in mass percent based on the oxides:
from 68 to 81% of $SiO_2$,
from 0.2 to 18% of $Al_2O_3$,
from 0 to 3% of $B_2O_3$,
from 0.2 to 11% of MgO,
from 0 to 3% of CaO,
from 0 to 3% of SrO,
from 0 to 3% of BaO,
from 0 to 1% of $ZrO_2$,
from 1 to 18% of $Na_2O$,
from 0 to 15% of $K_2O$, and
from 0 to 2% of $Li_2O$,
wherein $Al_2O_3+K_2O$ is from 7 to 27%,
$Na_2O+K_2O$ is from 11.5 to 22%,
MgO+CaO+SrO+BaO is from 0.2 to 14%,
$MgO+0.357Al_2O_3-0.239K_2O-5.58$ is from −3.0 to 1.5,
$Na_2O+0.272Al_2O_3+0.876K_2O-16.77$ is from −2.0 to 2.5,
a glass transition temperature is 500° C. or higher, and
an average thermal expansion coefficient at from 50 to 350° C. is less than $85 \times 10^{-7}/°$ C.

2. The glass substrate according to claim 1, wherein a relationship between a temperature ($T_4$) at which a viscosity becomes $10^4$ dPa·s and a glass surface devitrification temperature ($T_c$) is $T_4-T_c \geq 0°$ C.

3. The glass substrate according to claim 1, wherein a relationship between a temperature ($T_4$) at which a viscosity becomes $10^4$ dPa·s and a glass inner devitrification temperature ($T_d$) is $T_4-T_d \geq 150°$ C.

4. The glass substrate according to claim 1, wherein the glass substrate is a plate glass.

5. The glass substrate according to claim 1, wherein the $SiO_2$ content is 70.5% or more.

6. The glass substrate according to claim 1, wherein the $MgO+0.357Al_2O_3-0.239K_2O-5.58$ is from −2.0 to 1.5.

7. The glass substrate according to claim 1, wherein the $MgO+0.357Al_2O_3-0.239K_2O-5.58$ is from −1.0 to 1.5.

8. The glass substrate according to claim 1, wherein $Na_2O+0.272Al_2O_3+0.876K_2O-16.77$ is from −1.5 to 2.0.

9. The glass substrate according to claim 1, wherein $Na_2O+0.272Al_2O_3+0.876K_2O-16.77$ is from −1.0 to 1.0.

10. The glass substrate according to claim 1, wherein a compaction of the glass substrate is 40 ppm or less during heat treatment between 150 to 300° C.

11. The glass substrate according to claim 1, wherein a compaction of the glass substrate is 20 ppm or less during heat treatment between 150 to 300° C.

12. The glass substrate according to claim 1, wherein a compaction of the glass substrate is 10 ppm or less during heat treatment between 150 to 300° C.

13. The glass substrate according to claim 1, wherein the average thermal expansion coefficient at from 50 to 350° C. is more than $70 \times 10^{-7}/°$ C.

14. The glass substrate according to claim 1, wherein a temperature at which a viscosity of the glass substrate becomes $10^2$ dPa·s is 1,750° C. or lower.

15. The glass substrate according to claim 1, wherein the $Al_2O_3$ content is between 4 and 12% in mass percent.

16. A method for manufacturing a glass substrate, comprising molding a molten glass obtained by melting a raw material into a plate glass using a float process to obtain the glass substrate according to claim 2.

17. A method for manufacturing a glass substrate, comprising molding a molten glass obtained by melting a raw material into a plate glass using a fusion process to obtain the glass substrate according to claim 3.

* * * * *